Patented Dec. 2, 1941

2,264,654

UNITED STATES PATENT OFFICE 2,264,654

PROCESS OF TREATING ALGINIC MATERIAL FOR THE PRODUCTION OF USEFUL PRODUCTS

Robert Boyd, Vancouver, British Columbia, Canada

No Drawing. Application August 8, 1939, Serial No. 289,042

8 Claims. (Cl. 252—179)

This invention relates to a process of treating alginic material for the production of useful products.

An object of the present invention is the provision of a process for producing a substance or product with improved cationic and colour absorption properties.

Another object is the provision of a process for producing an improved substance or product having the property of absorbing colouring matters from water or aqueous solutions such as raw sugar solutions, sugar-beet juice and the like.

A further object is the provision of a process of treating alginic material for the production of a substance with high cationic and colour absorption properties, iodine and potash.

The term "alginic material" is intended to include alginic acid, its derivatives, alginates and raw materials, such as, marine algae, containing alginates.

Heretofore iodine and potash have been recovered from seaweed after the organic matter has been destroyed by distillation or combustion.

According to the present invention, alginic material is mixed and heated with sulphuric acid under certain conditions to convert the organic matter into a colloidal substance or resin having high cation absorption properties. The by products, such as, iodine and potash, when present, may be removed in any suitable manner. The colloidal substance or resin obtained has the property of absorbing colouring matters from water or aqueous solutions such as raw sugar solutions, sugar-beet juice and the like.

Numerous substances are known which absorb cations from aqueous solutions but these differ from one another and from the substance obtained by this process in various ways and especially in their respective capacities to absorb certain cations. The substance of the present process exhibits superior absorption of calcium ions along with good absorption of other ions, such as, potassium and iron. For this reason, the substance may be used in softening hard water and in the purification of aqueous solutions, such as, for example sugar solutions and juices.

In carrying out the invention, alginic material, such as, for example, seaweed or kelp, is mixed and heated with sulphuric acid until a test-sample of the reaction mixture after being washed acid-free imparts no appreciable amount of colour to boiling water. The final temperature varies somewhat according to the rate of heating and amount of excess acid present. The seaweed may be employed in a wet condition, or it may be subjected to a preliminary drying. In the former case, the water present is boiled off during the subsequent heating with sulphuric acid. Like-wise, it is immaterial whether dilute or concentrated sulphuric acid be used, for the necessary conditions of temperature and concentration become established as heating progresses. As a matter of convenience, commercial sulphuric acid is most suitable. The seaweed or kelp may be used as collected, or it may be chopped or ground into small particles. If desired, it may be mixed with an inert material such as diatomaceous earth in order to obtain a more highly dispersed product. It has been found that the activity of the material produced by the action of sulphuric acid on the organic matter of alginic material can be enhanced by depositing the material over a large surface such as is possessed by fine powders in general. The conditions established in carrying out the invention are such that the sulphuric acid acts on the alginic acid and other organic compounds present in the algae in such manner as to convert these into a substance or resin having special cation-absorptive properties.

Iodine is liberated as the mixture of algae and sulphuric acid is heated. Potash may be recovered from the substance or resin by leaching with water followed by crystallization.

The following is one example of how the invention may be carried out:

Seaweed or kelp may or may not be dried and/or ground or crushed to a coarse powder. To one part of this seaweed or kelp are added three parts of sulphuric acid and the mixture is heated. A rapid reaction takes place with considerable foaming at first. As the temperature rises, iodine is liberated and may be recovered by distillation. The temperature of the reaction mixture is held around 150° C., until a sample after being washed acid-free and then boiled with water imparts no appreciable colour to the water. Heating is then discontinued and the reaction-mixture is extracted with water. The aqueous extract is concentrated and potash salts recovered by crystallization, while the black organic resinous residue is further washed with water until acid free.

Another example is as follows:

Seaweed or kelp, preferably dried and powdered, is mixed with approximately an equal weight of a high grade diatomaceous earth, such as is used for filtration purposes, and three times its weight of concentrated sulphuric acid. The mixture is heated to about 150° C.; iodine distils off quickly and may be recovered by condensation while heating is continued until a product insoluble in boiling water is obtained. The potash salts are then leached out and are recovered by concentration and crystallization; the organic or resin residue and diatomaceous earth mixture is washed acid-free and is then ready for use.

The substance obtained by this process is a black resin insoluble in water and having cation absorption properties of a selective character. When introduced into a solution containing small amounts of calcium ions in presence of relatively large amounts of salts of the alkalies, this compound removes a greater amount of the calcium ions than other known cation-absorbents. This property is valuable in the softening of hard water and in purifying liquids which are to be concentrated and in which the presence of calcium salts is objectionable because of their scale-forming characteristics. The beet-sugar industry provides an example of such conditions. Beet-juice contains notable amounts of soluble potash salts and in the manufacture of beet-sugar the presence of lime-salts left in the juice from the lime-carbonation process is objectionable, since no practical way of removing them has been found heretofore. This difficulty may be overcome by the use of the present invention. It was found in one experiment that when beet-juice at 10° Brix was treated with this black alginic-sulphuric resin equivalent to two percent on the solids in the juice, 38 percent of the lime (CaO) present was removed, while the same amount of the known catechol-sulphuric resin removed only 4.5 percent of the lime. The relative amounts removed varies with the quality of the juice and the amount of lime-salts present. Thus, in another experiment with 14° Brix juice the following figures were obtained:

| | Percent of total mineral salts absorbed | Percent of CaO present absorbed |
|---|---|---|
| With 2 percent catechol-surplhuric resin | 5.9 | 52.5 |
| With 2 percent alginic-sulphuric resin | 7.6 | 67.0 |

From a 0.5 percent aqueous solution of calcium chloride, aliginic-sulphuric resin was found to absorb 12 percent of its weight, whereas a catechol-sulphuric resin absorbed 5.9 percent of its weight.

The alginic-sulphuric resin obtained by this invention has other useful properties. It absorbs iron ions readily and in this respect has a use in the sugar industry where the presence of iron in solutions and juices gives rise to dark-coloured compounds. The resin has also been found to act as a decolorizing agent and can be used for the removal of organic colouring material from sugar solutions. Another property of the alginic-sulphuric resin is that after it has been used for the absorption of colouring matter and cations, it can be regenerated by washing with hot water and by acid-treatment; hence it may be used repeatedly.

It is to be understood that the invention is not limited to this disclosure of species as many variations thereof may be adopted. The proportion of acid to alginic material may be varied over a large range as an excess of acid does not interfere with the reaction but it helps to disperse the product and therefore improves its activity while a reduced amount of acid may be used with satisfactory results. The alginic material may advantageously be mixed with other inert materials, such as silica, having a large surface upon which the alginic-sulphuric resin becomes dispersed since the more highly dispersed the compound is the more active it is as an absorbent.

Various modifications may be made in this invention without departing from the spirit thereof or the scope of the claims and therefore the exact forms shown are to be taken as illustrative only and not in a limiting sense, and it is desired that only such limitations shall be placed thereon as are set forth in the accompanying claims.

What I claim as my invention is:

1. A process of treating alginic material for the production of useful products which consists in mixing the alginic material with an inert solid siliceous material possessing a large surface area and with concentrated sulphuric acid, heating the mixture to a temperature of approximately 150° C. until a sample thereof after being washed acid-free and then boiled with water imparts no appreciable colour to the water, and freeing the organic residue and inert material mixture from soluble salts and acid by washing with water, said residue having cation and colour absorption properties.

2. A process of treating alginic material for the production of useful products which consists in mixing algae with concentrated sulphuric acid, heating the mixture to a temperature of approximately 150° C., distilling off the iodine of the algae, leaching out the potash salts of the algae, and obtaining a residue with cationic and colour absorption properties.

3. A process of treating alginic material for the production of useful products which consists in mixing the alginic material with concentrated sulphuric acid, heating the mixture to a temperature of approximately 150° C. until a sample thereof after being washed acid-free and then boiled with water imparts no appreciable colour to the water, and removing the by-products to obtain a residual substance with cationic and colour absorption properties.

4. A process of treating alginic material for the production of useful products which consists in mixing algae with approximately an equal weight of diatomaceous earth and with three times its weight of concentrated sulphuric acid, heating the mixture, distilling off the iodine of the algae as it is liberated, continuing the heating at a temperature of approximately 150° C. until a product insoluble in boiling water is obtained, leaching out the potash salts with water, and washing the organic residue and diatomaceous earth mixture with water, said residue having cationic and colour absorption properties.

5. A process of treating alginic material for the production of useful products which consists in mixing the alginic material with diatomaceous earth and with sulphuric acid, heating the mixture to a temperature of approximately 150° C., until a sample thereof after being washed acid-free and then boiled with water imparts no appreciable colour to the water, and freeing the organic residue and diatomaceous earth mixture from soluble salts and acid by washing with water, said residue having cationic and colour absorption properties.

6. A material for softening water and purifying aqueous solutions which is substantially free from water-soluble constituents, which is adapted to absorb potassium, calcium and iron ions and coloured impurities found in sugar solutions and which is the product produced by mixing alginic material with concentrated sulphuric acid, heating the mixture at 150° C. until a sample thereof, after being washed acid-free and then boiled with water, imparts no appreciable colour to the water, and freeing the organic residue from soluble salts and acid by washing with water.

7. A material for purifying aqueous solutions which is substantially free from water-soluble constituents, which is adapted to absorb potassium, calcium and iron ions and coloured impurities found in sugar solutions and which is the product produced by mixing alginic material with an inert siliceous powder and with concentrated sulphuric acid, heating the mixture at 150° C. until a sample thereof, after being washed acid-free and then boiled with water, imparts no appreciable colour to the water, and freeing the organic residue and inert powder mixture from soluble salts and acid by washing with water.

8. A material for purifying aqueous solutions which is substantially free from water-soluble constituents, which is adapted to absorb potassium, calcium and iron ions and coloured impurities found in sugar solutions and which is the product produced by mixing alginic material with diatomaceous earth and with concentrated sulphuric acid, heating the mixture at 150° C. until a sample thereof, after being washed acid-free and then boiled with water, imparts no appreciable colour to the water, and freeing the organic residue and diatomaceous earth mixture from soluble salts and acid by washing with water.

ROBERT BOYD.